No. 751,191. PATENTED FEB. 2, 1904.
H. P. MAXIM.
ELECTRIC MOTOR.
APPLICATION FILED MAR. 12, 1903.
NO MODEL. 2 SHEETS—SHEET 2.

No. 751,191. Patented February 2, 1904.

UNITED STATES PATENT OFFICE.

HIRAM PERCY MAXIM, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR.

SPECIFICATION forming part of Letters Patent No. 751,191, dated February 2, 1904.

Application filed March 12, 1903. Serial No. 147,538. (No model.)

*To all whom it may concern:*

Be it known that I, HIRAM PERCY MAXIM, a citizen of the United States, residing in Pittsburg, in the county of Allegheny and State of Pennsylvania, have invented a new and useful Improvement in Electric Motors, of which the following is a specification.

My invention relates to electric motors; and it has for its object to provide a motor of compact and durable construction which may be adapted for application to any kind or type of vehicle or to other machine which it is desired to operate by means of electrical energy.

My invention is illustrated in the accompanying drawings, in which—

Figure 1:
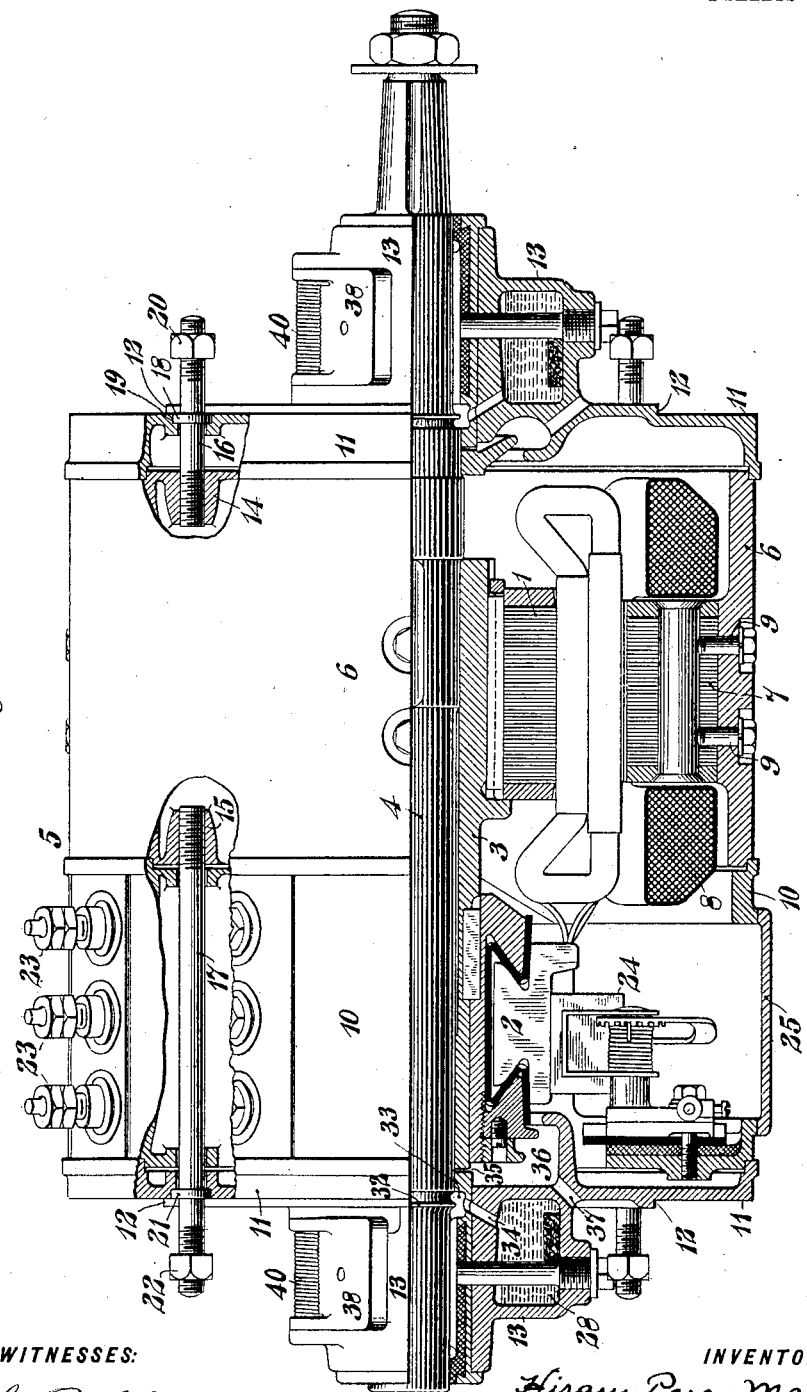
Figure 2:
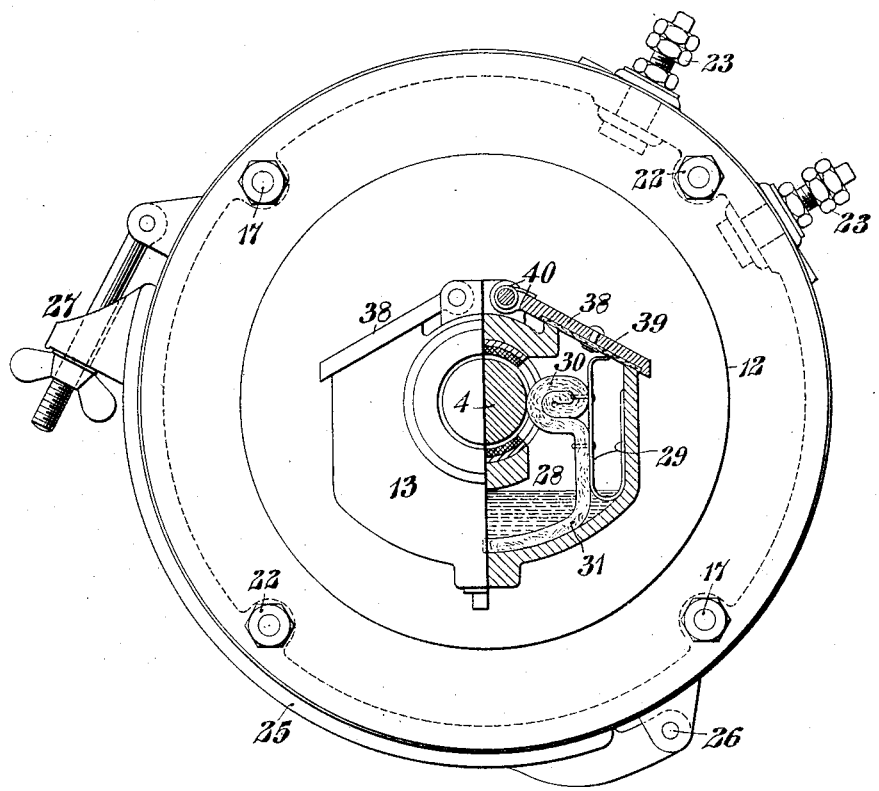

Figure 1 is a view, partially in side elevation and partially in section, of the motor, parts being broken away to show the internal construction. Fig. 2 is a view, partially in end elevation and partially in section, of the motor shown in Fig. 1.

The armature 1 and the commutator drum or cylinder 2 of the motor are mounted upon a single sleeve 3, which surrounds and is suitably fastened to the shaft 4 in the usual manner. The armature and commutator-cylinder are completely inclosed by the frame 5, which consists of a cylinder 6, upon the inner side of which are located the field-magnet pole-pieces 7 and coils 8, (the pole-pieces being here shown as fastened in position by means of bolts 9,) a shorter cylinder 10, surrounding the commutator-drum, and two end plates 11, each of which is provided with an annular shoulder 12 and a combined bearing and oil box 13.

The cylinder 6 is provided at its outer end with a set of interior lugs 14 and at its inner end with a similar set of lugs 15, each of the lugs of each set being bored out and internally screw-threaded in order to respectively receive the inner ends of the fastening-bolts 16 and 17, the former being provided with integral flanges or collars 18, which are seated in corresponding recesses 19 in the end plate 11 and each of which also projects outward from the end plate and is screw-threaded and provided with a nut 20. Each of the bolts 17 is of sufficient length to project entirely through the cylinder 10, in order to engage with the corresponding boss 15 on the cylinder 6, and thus clamp the cylinder 10 between the cylinder 6 and its end plate 11, the latter being recessed to receive the projections 21 on the bolts 17. These bolts also project outward from the end plate and are screw-threaded and provided with nuts 22. The number of bolts 16 and 17 may be anything desired; but they are preferably equally spaced, and, as here shown, each set comprises four bolts.

The cylinder 10 is provided with external binding-posts 23 for connection with the conductors which convey the propelling-currents to and from the motor, these binding-posts being connected at their inner ends to the brushes 24 of the commutator in the usual manner. The cylinder 10 is also provided with a door 25, hinged to the cylinder at one end, as indicated at 26, and fastened at its other end by a suitable device 27, this door being provided in order that the commutator may be readily inspected and the brushes adjusted or replaced as occasion may require.

By making the cylinder portion of the motor-frame in two parts and clamping the said parts together by equally-spaced bolts, as shown, I am enabled to readily adapt the motor to any relations of surrounding vehicle or machine parts that may be presented in practice, since by removing the bolts 17 the cylinder 10 may be adjusted ninety, one hundred and eighty, or two hundred and seventy degrees without turning the end plate, and therefore without interfering with the proper location of the oil-receptacle.

By providing a greater number of equally-spaced clamping lugs and bolts a smaller degree of adjustment could be secured; but ordinarily that provided by the use of four bolts is sufficient.

By providing the bolts 16 and 17 with the outwardly-projecting screw-threaded portions and the nuts I am enabled to attach the motor to any sort of hanger which may be provided or desired, and the annular shoulders 12 enable me to properly center the hangers with reference to the ends of the motor.

In order to properly lubricate the bearing portions of the shaft 4, I so form the box 13 as to provide an oil-well 28 below the shaft-bearing and fasten to the side of the box a spring 29, to which is riveted or otherwise fastened the rolled end 30 of a strip of felt 31, the lower end of which rests in the bottom of the oil-well 28, this roll 30 being of such dimensions that the spring will press it against the adjacent portion of the shaft. The capillary action of the felt will serve to draw the oil from the well and apply it to the shaft.

In order to prevent any oil from reaching the commutator, I provide the shaft with an annular rib or flange 32 and form around this flange a relatively deep annular recess 33, from which a passage 34 leads to the oil-well. Consequently any oil that creeps along the shaft as far as this flange drops into the recess 33 and flows back into the well.

Since it is possible that a small amount of oil may pass beyond the recess 33, I provide another narrow space 35 between the end of the sleeve 3 and the bearing, through which the oil may drop into a chamber or recess 36 and from which it may flow to the ground or elsewhere away from the commutator through a duct or passage 37.

The combined oil and bearing box 13 is provided with two covers 38, which are hinged at one end to the box and are provided on their inner surfaces with strips of felt or other yielding material 39, which rests upon the edges of the box and thus prevents the entrance of any dust or dirt from outside. The covers 38 are held to their seats by any suitable means, that here shown being coiled springs 40.

It will be seen from the illustration and foregoing description that the motor is of compact construction and symmetrical design, is provided with efficient lubricating means, and is readily adjustable so as to adapt it to a variety of conditions of service, and while the details of construction shown and described have been found admirably adapted to practical service I desire it to be understood that any departures from such details which do not change the mode of operation or result are within the scope of my invention.

I claim as my invention—

1. A motor-frame comprising two cylinders and two end plates clamped together and completely inclosing the armature, the field-magnet pole-pieces and coils and the commutator.

2. The combination with an armature and its commutator-drum, of a cylindrical field-magnet frame or shell provided with interior pole-pieces and coils, a cylinder bolted to one end of the field-magnet cylinder and surrounding the commutator and end plates bolted to the outer ends of said cylinders.

3. A motor-frame comprising two cylinders one of which has a plurality of internal, equidistant lugs having internal screw-threads, circular plates for the outer ends of said cylinders and bolts for engaging said end plates and lugs and projecting outward from the end plates.

4. An electric-motor frame comprising two cylinders one of which has a plurality of equally-spaced, internal lugs, end plates and bolts extending through the end plates and into the lugs and projecting outwardly from the end plates.

5. An electric-motor frame comprising a field-magnet cylinder having internal lugs at each end, a commutator-inclosing cylinder making end-to-end engagement with said field-magnet cylinder, circular plates for closing the outer ends of the cylinders and bolts extending through the end plates and the commutator-inclosing cylinder and screwed into the lugs on the field-magnet cylinder.

6. An electric-motor frame comprising two cylinders one of which has equally-spaced internal lugs, end plates, a set of bolts for clamping the cylinders and one end plate together and a set of bolts for clamping the other end plate to its cylinder, both sets of bolts projecting outwardly from the end plates for attachment to suitable hangers.

7. An electric-motor frame comprising two cylinders, two end plates having centering-shoulders and bolts which clamp said cylinders and plates together and project beyond the plates for attachment to suitable hangers.

8. An electric-motor frame comprising two end-to-end shells, two end plates having annular centering-lugs and clamping-bolts which fasten the shells and end plates together and project beyond said plates for attachment to suitable hangers.

9. An electric motor having end plates provided with annular centering-shoulders and bolts for engaging suitable hangers and clamping them against said centering-shoulders.

10. An electric-motor frame comprising two shells, two end plates and means for clamping said members together to completely inclose the armature, the field-magnet pole-pieces and coils and the commutator.

11. An electric-motor frame comprising two end-to-end shells one of which surrounds the motor-armature and is provided with field-magnet pole-pieces and coils and the other of which surrounds the commutator, end plates and bolts for clamping said shells and end plates together.

12. An electric-motor frame comprising two end-to-end shells one of which surrounds the armature and is provided with pole-pieces and coils and the other of which surrounds the commutator, end plates provided with centering-shoulders and bolts for clamping said shells and end plates together and to suitable hangers.

In testimony whereof I have hereunto subscribed my name this 5th day of March, 1903.

HIRAM PERCY MAXIM.

Witnesses:
B. M. SAWYER,
JAMES B. YOUNG.